(12) United States Patent
Worthing, Jr. et al.

(10) Patent No.: US 10,816,963 B2
(45) Date of Patent: Oct. 27, 2020

(54) SYSTEMS AND METHODS FOR AUTOMATED WELDING

(71) Applicant: General Electric Company, Schenectady, NY (US)

(72) Inventors: Richard Roy Worthing, Jr., Liberty Township, OH (US); Mark Dean Pezzutti, Mason, OH (US); Lyle Timothy Rasch, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 15/631,119

(22) Filed: Jun. 23, 2017

(65) Prior Publication Data
US 2018/0373231 A1 Dec. 27, 2018

(51) Int. Cl.
*G05B 19/418* (2006.01)
*F01D 5/00* (2006.01)
(Continued)

(52) U.S. Cl.
CPC ......... *G05B 19/41885* (2013.01); *B23K 9/04* (2013.01); *B23K 9/044* (2013.01);
(Continued)

(58) Field of Classification Search
CPC ...... G05B 19/4155; G05B 2219/42155; G05B 2219/45135; G05B 19/19; G05B 19/41885; B23Q 15/00; B23K 31/00; B23K 11/11; B23K 9/0953; B23K 26/032; B23K 26/342; B23K 9/04; B23K 9/095; B23K 9/0956; B23K 9/044; B23K 101/001; B23K 9/0026; B23K 9/32; B23K 31/02; B23K 37/00;
(Continued)

(56) References Cited

U.S. PATENT DOCUMENTS 6,054,672 A 4/2000 Foster et al.
6,912,446 B2 6/2005 Wang et al.
(Continued)

FOREIGN PATENT DOCUMENTS

CN 1408500 A 4/2003
CN 102350571 A 2/2012
CN 104416251 A 3/2015

OTHER PUBLICATIONS

Chinese Office Action and Search Report Corresponding to Application. 201810651405 dated Jul. 3, 2020.

*Primary Examiner* — Mohammad Ali
*Assistant Examiner* — Sheela Rao
(74) *Attorney, Agent, or Firm* — Dority & Manning, P.A.

(57) ABSTRACT

An automated welding system includes a mounting platform, a welding tool, an imaging device configured to acquire data associated with an object, and a controller. The controller is configured to receive the acquired data, determine an area to be welded in the acquired data, retrieve stored master model data associated with the object, and compare the acquired data to the stored master model data to identify a master model area in the acquired data. The controller is also configured to mask the master model area in the acquired data, such that the master model area is excluded from the area to be welded, and generate control instructions for controlling at least one of the mounting platform and the welding tool to weld the area to be welded.

20 Claims, 3 Drawing Sheets

(51) Int. Cl.
*B23K 9/095* (2006.01)
*B23K 26/03* (2006.01)
*B23K 26/342* (2014.01)
*B23K 9/04* (2006.01)
*B23P 6/00* (2006.01)
*B23P 6/04* (2006.01)
*B23K 101/00* (2006.01)
*F01D 5/12* (2006.01)

(52) U.S. Cl.
CPC ............ *B23K 9/095* (2013.01); *B23K 9/0953* (2013.01); *B23K 9/0956* (2013.01); *B23K 26/032* (2013.01); *B23K 26/342* (2015.10); *B23P 6/007* (2013.01); *B23P 6/045* (2013.01); *F01D 5/005* (2013.01); *B23K 2101/001* (2018.08); *F01D 5/12* (2013.01); *F05D 2220/323* (2013.01); *F05D 2230/232* (2013.01); *F05D 2230/80* (2013.01); *F05D 2240/307* (2013.01); *G05B 2219/42155* (2013.01); *G05B 2219/45135* (2013.01)

(58) Field of Classification Search
CPC .......... B23P 6/007; B23P 6/045; F01D 5/005; F01D 5/12; F05D 2220/323; F05D 2230/80; F05D 2240/307; F05D 2230/232; Y02T 50/60
USPC ................ 700/160, 184, 245; 219/61.5, 91.1
See application file for complete search history.

(56) References Cited

U.S. PATENT DOCUMENTS

| | | |
|---|---|---|
| 7,689,003 B2 | 3/2010 | Shannon et al. |
| 8,528,857 B2 | 9/2013 | Hillereau et al. |
| 8,962,066 B2 | 2/2015 | Burd |
| 9,038,367 B2 | 5/2015 | Suciu et al. |
| 9,085,010 B2 | 7/2015 | Burd |
| 9,272,369 B2 | 3/2016 | Bruck et al. |
| 9,289,854 B2 | 3/2016 | Bruck et al. |
| 2013/0180107 A1 | 7/2013 | Woods et al. |
| 2015/0048058 A1* | 2/2015 | Bruck .................... B23K 26/34 219/76.14 |
| 2016/0288236 A1* | 10/2016 | Becker ................. B23K 9/0953 |
| 2017/0280114 A1* | 9/2017 | Samuelson ........... G06T 3/0068 |

* cited by examiner

SYSTEMS AND METHODS FOR AUTOMATED WELDING

BACKGROUND

The subject matter disclosed herein relates generally to an automated welding system and, more particularly, to an automated welding system that takes data of an object, such as one or more images of the object, to generate control instructions for welding the object.

At least some known welding systems are configured to use a welding tool, such as an arc welding tool, to weld an object. In some of these systems, the object is an airfoil, which is selected for repair after the airfoil has been in operation within an aircraft engine for some amount of time. During operation, the airfoil may sustain wear, which may adversely affect its performance. For example, cracks or blade tip abrasion may occur in the airfoil, which may affect the cooling circuits of the blade and/or the aerodynamic performance. A welding tool may be used to repair these cracks and to rebuild the blade tip.

Many known welding systems, particularly airfoil welding systems, are not fully automated. Such systems may produce an excess of process scrap and are frequently inefficient, because welders must be trained and re-trained on the welding equipment.

BRIEF DESCRIPTION

In one aspect, an automated welding system is provided. The automated welding system includes a mounting platform, a welding tool, an imaging device configured to acquire data associated with an object, and a controller. The controller is configured to receive the acquired data, determine an area to be welded in the acquired data, retrieve stored master model data associated with the object, and compare the acquired data to the stored master model data to identify a master model area in the acquired data. The controller is also configured to mask the master model area in the acquired data, such that the master model area is excluded from the area to be welded, and generate control instructions for controlling at least one of the mounting platform and the welding tool to weld the area to be welded.

The controller may also be configured to generate control instructions for controlling at least one of a position and an orientation of at least one of the mounting platform and the welding tool. In addition, the controller may be configured to analyze at least one image pixel in the acquired data to determine the area to be welded. Further, in some embodiments, the controller may be configured to superimpose the master model data of the object over the acquired data of the object such that the master model area is excluded from the area to be welded. Further still, in some embodiments, the automated welding system may include a structure configured to receive and secure the object, where the structure includes at least one of a heating apparatus, an insulating material, a shielding medium, a viewing window, a temperature sensor, and a lighting system. In addition, the controller may be configured to generate a control instruction for controlling a heating apparatus, which may be operable to control an internal temperature of the structure. In some embodiments, the control instruction for controlling the internal temperature of the structure may include an instruction to maintain the internal temperature of the structure at a predetermined temperature range.

In another aspect, an article of manufacture is provided. The article includes a non-transitory, tangible, computer readable storage medium having instructions stored thereon that, in response to execution by a controller, cause the controller to perform operations including receiving the acquired data, determining an area to be welded in the acquired data, retrieving stored master model data associated with the object, and comparing the acquired data to the stored master model data to identify a master model area in the acquired data. The controller is also configured to perform operations including masking the master model area in the acquired data, such that the master model area is excluded from the area to be welded, and generating control instructions for controlling at least one of the mounting platform and the welding tool to weld the area to be welded.

In some embodiments, the article may also include a structure configured to receive the object, and the controller may perform operations including generating a control instruction for controlling a heating apparatus, which is operable to control an internal temperature of the structure. In some embodiments, the control instruction for controlling the heating apparatus of the structure may be an instruction to maintain the internal temperature of the structure at a predetermined temperature range. In addition, in some embodiments, the controller may perform operations including generating control instructions for controlling at least one of a position and an orientation of at least one of the mounting platform and the welding tool. The controller may also perform operations including superimposing the stored master model data over the acquired data, such that the master model area is excluded from the area to be welded. In some embodiments, the article may include a mounting platform for mounting the object, where the mounting platform includes at least one joint that facilitates motion of the mounting platform.

In yet another aspect, a method for operating a welding system is provided. The method includes receiving the acquired data, determining an area to be welded in the acquired data, retrieving stored master model data associated with the object, and comparing the acquired data to the stored master model data to identify a master model area in the acquired data. The controller is also configured to perform operations including masking the master model area in the acquired data, such that the master model area is excluded from the area to be welded, and generating control instructions for controlling at least one of the mounting platform and the welding tool to weld the area to be welded.

The method may also include generating control instructions for controlling at least one of a position and an orientation of at least one of the mounting platform and the welding tool. In some embodiments, the method may include receiving the object within a structure, and generating, by the controller, a control instruction for controlling a heating apparatus operable to control an internal temperature of the structure. In addition, the method may include superimposing, by the controller, the stored master model data over the acquired data, such that the master model area is excluded from the area to be welded.

DRAWINGS

These and other features, aspects, and advantages of the present disclosure will become better understood when the following detailed description is read with reference to the accompanying drawings in which like characters represent like parts throughout the drawings, wherein.

Figure 1:
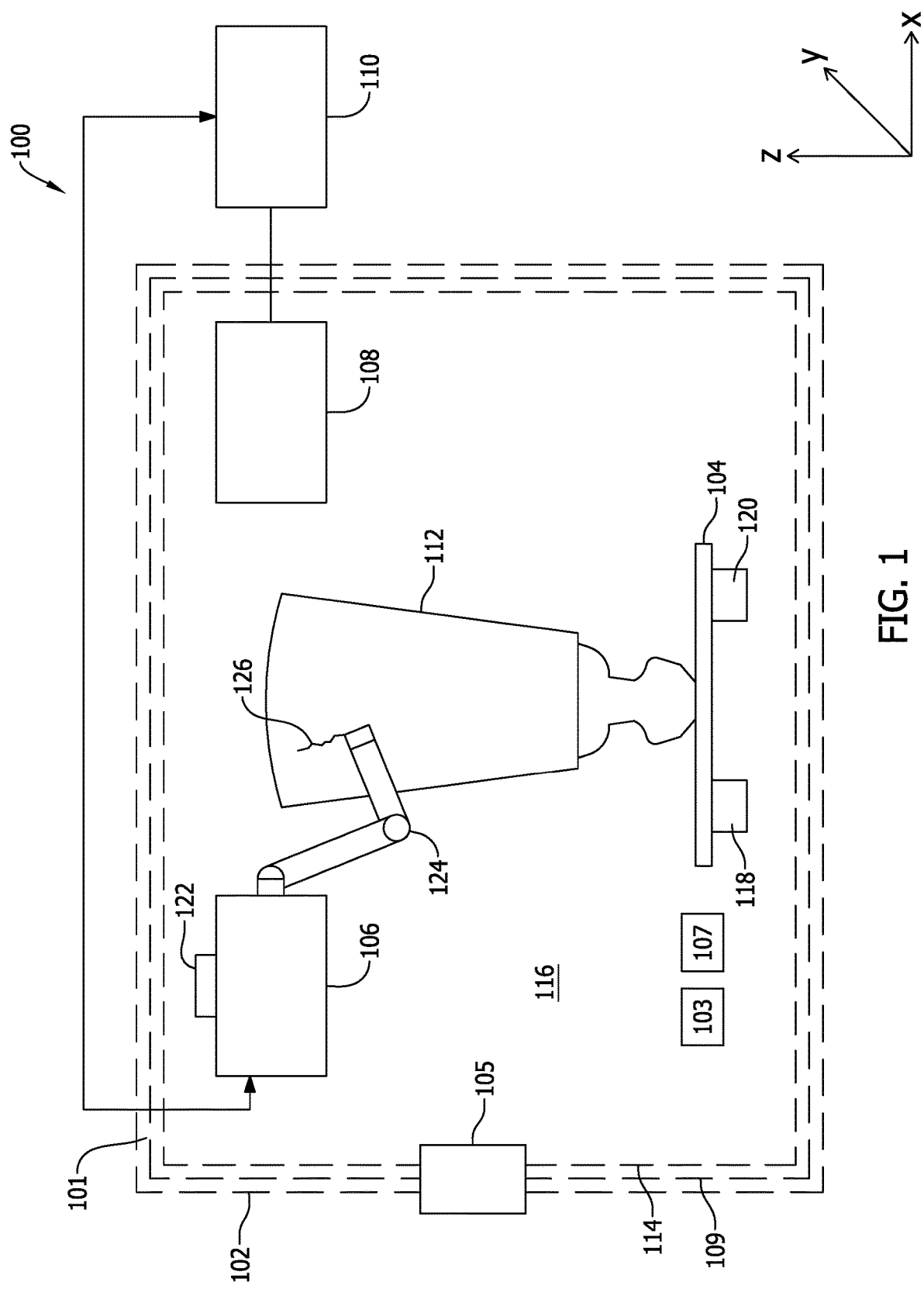
FIG. 1 is a schematic view of an exemplary automated welding system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the terms "master model" and "master part" are interchangeable, and include any data used to represent the desired configuration of an object 112.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Embodiments of the present disclosure relate to an automated welding system. The system generally includes a structure, such as a welding box, a welding tool, an imaging device, a controller, and a mounting platform. In operation, an object, such as an airfoil, is secured on the mounting platform and placed within the structure. The object is rotated and/or translated on the mounting platform through one or more inspection positions. At each inspection position, the imaging device acquires data, such as image data, for the object and transmits the acquired data to the controller.

The controller receives the acquired data and compares the acquired data to master model data of the object. In various embodiments, the master model data includes one or more images and electronic data representative of the object. The controller identifies one or more areas to be welded based upon the comparison and generates control instructions. One or more standard object features (e.g., cooling holes) are masked by the controller, so that these features are not identified as areas to be welded. Finally, the object is heated within the structure, and the welding tool is operated, by the controller and based upon the control instructions, to repair the object. The images may also be acquired and compared after heating. Further, in some embodiments, no comparison is performed. Rather, the controller identifies one or more areas to be welded based solely upon an examination of the acquired data.

As used herein, an object, such as an airfoil, may be associated with "master model" data, such as master model data and/or one or more master model images of the object. Master model data and images may be stored individually and/or as part of a data file. A master model image is an image of the object taken prior to installation of the object in an operational system. For example, where the object is an airfoil, a master model image of the airfoil is the nominal dimensional definition of the airfoil taken prior to installation of the airfoil in an aircraft engine. A master model is the engineering definition of the zero-defect nominal part. Master model data may also include historical data, which may include one or more master model object images, one or more electronic models associated with an object, coordinate points associated with an object, dimensional data, and the like. Master model data may be collected during previous maintenance of an object, such as, for example, during an overhaul of the object and/or during an overhaul of a system within which the object is configured to operate. In various embodiments, master model data may also include one or more electronic representations of an object, one or more textual descriptions of an object, one or more coordinate system points defining a shape of an object, and the like.

In addition, although the systems, methods, and articles of manufacture are described herein with reference to an object such as an airfoil, other objects, such as marine propeller blades, components of terrestrial vehicles, and/or any other object which may be welded as part of a repair or manufacturing process, are contemplated by and within the scope of the present disclosure.

FIG. 1 is a schematic view of an exemplary automated welding system 100. Automated welding system 100 includes a structure 102, a mounting platform 104, a welding tool 106, an imaging device 108, and a controller 110.

Structure 102 is a container, such as a welding box, within which an object 112, such as an airfoil, is placed, and within which object 112 is welded. As shown, object 112 may include an area to be welded 126, such as a crack, and object 112 may be placed within structure 102, such that area to be welded 126 may be welded by automated welding system 100.

In the exemplary embodiment, structure 102 includes an internal surface 114 that defines a welding compartment 116. Structure 102 may be insulated by way of one or more insulating materials 101 and/or one or more shielding media 109 and may, in addition, include one or more heating apparatuses 103, such as, but not limited to, one or more electrical heating apparatuses, one or more gas burners, and the like. As described below, heating apparatuses 103 may be configured to raise an internal temperature of structure 102 (within welding compartment 116) to a desired temperature, such as a temperature at which object 112 becomes ductile, malleable, semi-molten, or otherwise workable. In addition, heating apparatuses 103 may be configured to maintain an internal temperature of structure 102 within a desired or predefined temperature range, such as a temperature range within which object 112 becomes ductile, malleable, semi-molten, or otherwise workable. Structure 102 may also include a viewing window 105 and/or one or more temperature sensors 107. Structure 102 may also be filled with an inert gas such as argon or helium. The gas may be selected to be compatible with the material of object 112.

Mounting platform 104 is a support and mounting structure. In the exemplary embodiment, object 112 is secured or mounted on mounting platform 104 for welding operations. Mounting platform 104 may include one or more clamps or fasteners for mounting and securing object 112. Mounting platform 104 may also include one or more electromechanical actuators 118 and/or one or more joints 120, which may facilitate motion of mounting platform 104. For example, mounting platform 104 may be configured to rotate about the x, y, and/or z axes. Mounting platform 104 may also be configured to translate along the x, y, and/or z axes.

Welding tool 106 is any tool capable of making a weld, such as, for example, a laser welding tool, an arc welding tool, a gas welding tool, a gas metal arc welding tool, and the like. Welding tool 106 may also include one or more electromechanical actuators 122 and/or one or more joints 124, which may facilitate motion of welding tool 106. For example, each joint 124 of welding tool 106 may be rotatable about the x, y, and/or z axes. Welding tool 106 may also be configured to translate along the x, y, and/or z axes.

Imaging device 108 is configured to acquire data associated with object 112, such as one or more images and/or other data of object 112. For example, imaging device 108 is a camera, such as a digital or CCD camera. Imaging device 108 is mounted within structure 102 and is disposed relative to object 112 at a position and angle suitable to acquire one or more images of object 112. In other embodiments, imaging device 108 is positioned outside of structure 102 in a position from which object 112 is viewable by imaging device 108. For example, imaging device 108 may, in some embodiments, be positioned outside of structure 102, such that imaging device 108 looks through viewing window 105.

Controller 110 coordinates the acquisition of data, such as one or more images, of object 112. In the exemplary embodiment, controller 110 includes one or more processors communicatively coupled to one or more tangible, non-transitory, memories. In some embodiments, controller 110 further coordinates the motion of mounting platform 104 and/or the motion of welding tool 106. Controller 110 may also coordinate the operation of welding tool 106.

Controller 110 acquires data about object 112 and creates a path for object 112. After controller 110 has identified at least one area to be welded 126 in at least one acquired image 304 (shown in FIG. 3), controller 110 generates one or more control instructions for controlling one or both of mounting platform 104 and/or welding tool 106. For example, the one or more control instructions may control a position and/or an orientation of mounting platform 104 and/or welding tool 106. The control instructions may be transmitted to mounting platform 104 and/or welding tool 106 for implementation.

Figure 2:
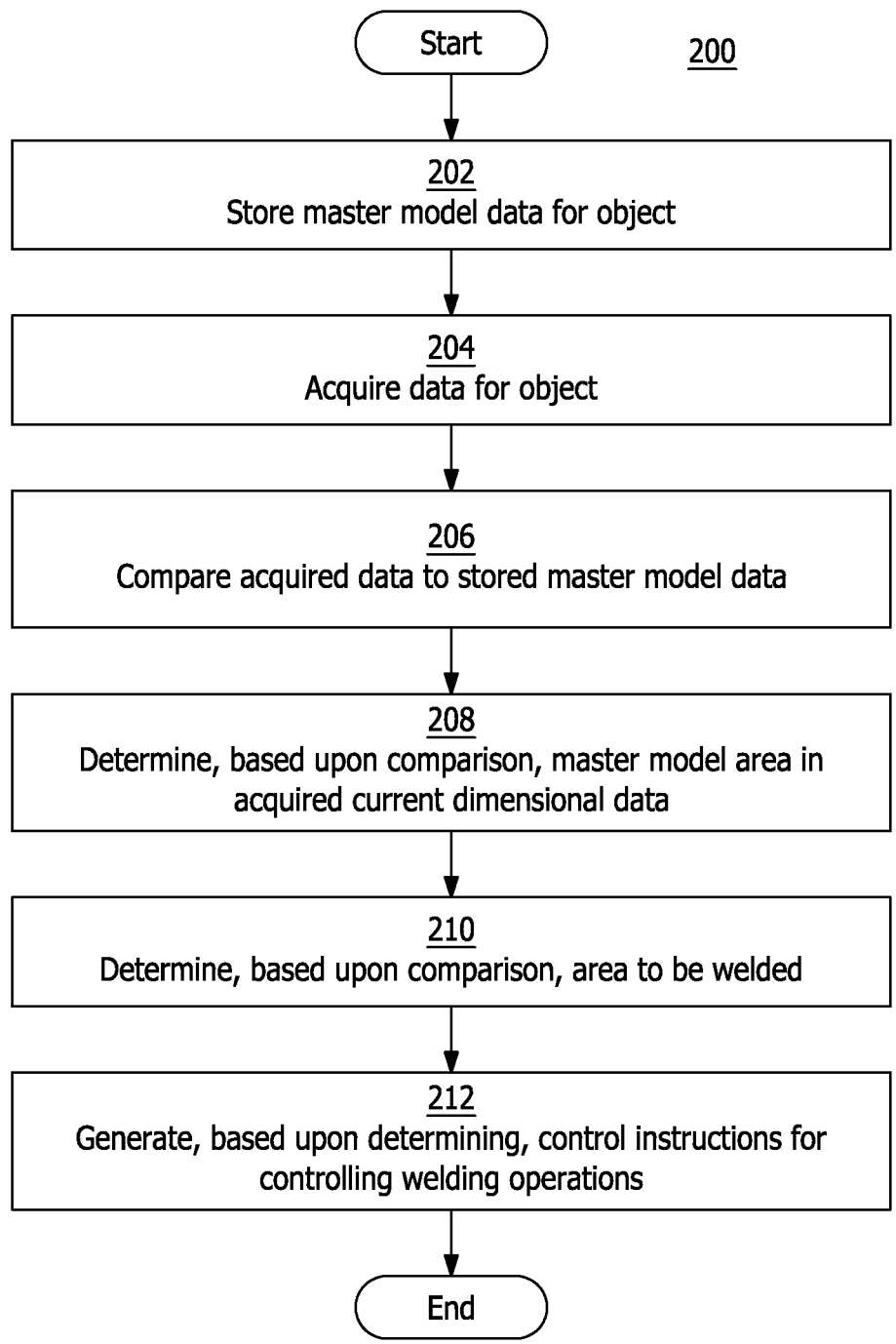
FIG. 2 is a flowchart illustrating an exemplary process for repairing an object using the automated welding system shown in FIG. 1.

FIG. 2 is a flowchart illustrating an exemplary process 200 for repairing object 112 using automated welding system 100 (shown in FIG. 1). With reference to FIGS. 1 and 2, in the exemplary embodiment, object 112 is placed within structure 102 for repair. For example, object 112 is manually or robotically mounted on mounting platform 104 within structure 102. Initially, master model or historical data associated with object 112 is stored for retrieval by controller 110 (step 202).

Inside structure 102, imaging device 108 acquires data of object 112, such as one or more images of object 112 (step 204). As used herein, "acquired data" may refer to one or more images of object 112 acquired by imaging device 108 of object 112 and/or any other data associated with object 112 that is acquired by imaging device 108, such as, for example, one or more infrared images of object 112. In addition, "acquired data" may include one or more "acquired images." For example, imaging device 108 scans or photographs object 112 to acquire at least one image of object 112. In the exemplary embodiment, imaging device 108 acquires a plurality of images of object 112. For example, object 112 is rotated and/or translated on mounting platform through one or more inspection positions. As object 112 is moved, imaging device 108 acquires a plurality of images of object 112 at each inspection position. The images may be of different portions of object 112 and may be collated or collected into an image data file.

The acquired data is transmitted by imaging device 108 to controller 110. Controller 110 receives the acquired data and compares the acquired data to stored, master model or historical data, of object 112 (step 206). As used herein, and as described above, "master model data" may include one or more master model images of object 112. Controller 110 may select a master model image that corresponds to an acquired image. For example, if a particular acquired image was taken from a particular inspection position relative to imaging device 108, a master model image taken from the same inspection position may be used for the comparison. In other embodiments, a composite image or representation formed of two or more images or data representations is used for comparison. To compare an acquired image to a master model image, controller 110 may compare each pixel in the acquired image to a corresponding pixel in the master model image, or controller 110 may compare a group of pixels in the acquired image to a group of pixels in the master model image.

Based upon the comparison, controller 110 identifies or determines at least one master model area in the acquired data or acquired image (step 208). For example, if a master model image includes a master model area, such as a cooling hole, controller 110 may identify or flag the pixels associated with the cooling hole in the acquired image. Controller 110 may further mask the pixels associated with the cooling hole in the acquired image, such that the pixels associated with the cooling hole are excluded from area to be welded 126 (as described below). Master model areas may also be flagged by comparison with features on a master part. However, in some embodiments, no comparison is performed. Rather, controller 110 identifies at least one area to be welded 126 based solely upon an examination or analysis of the acquired data.

Figure 3:
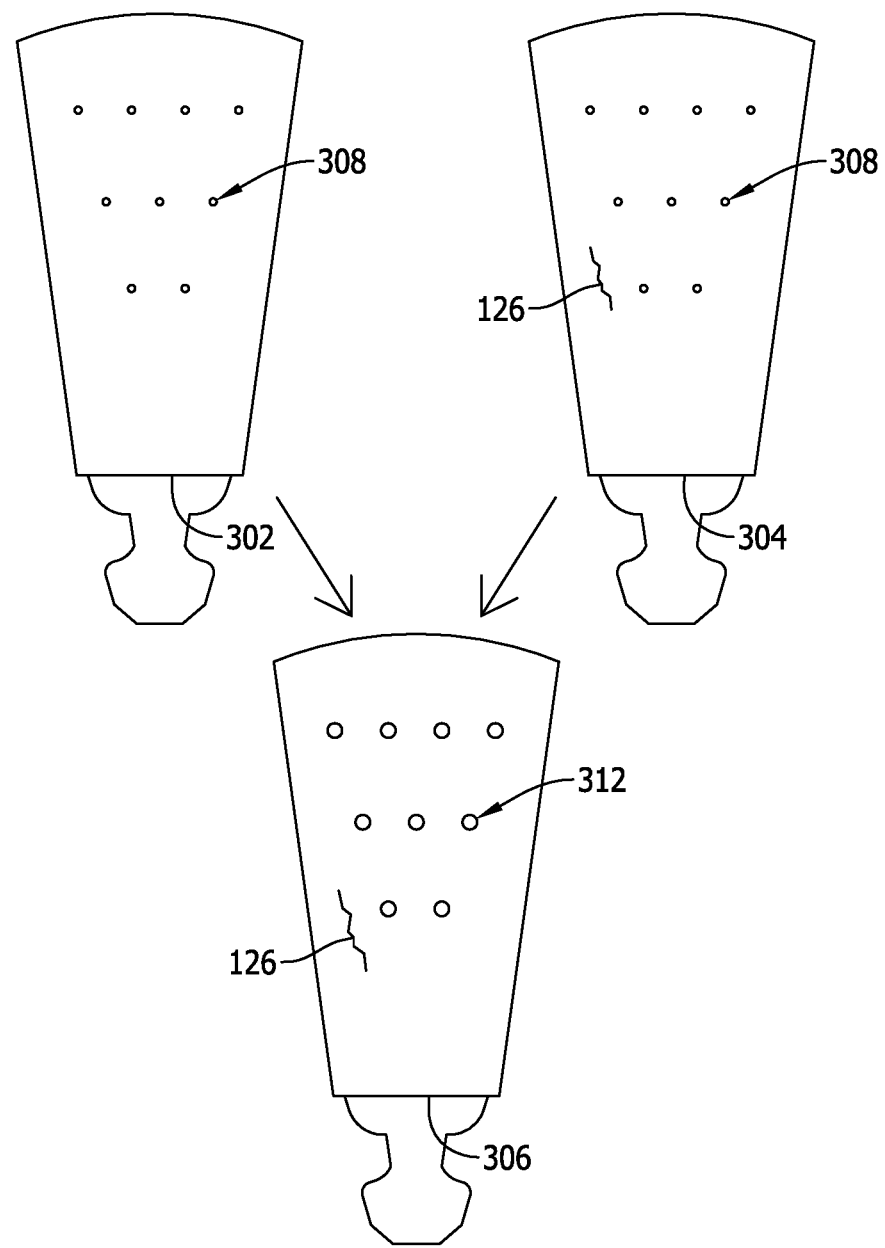
FIG. 3 is a schematic view of an exemplary master model image of an object, an exemplary acquired image of the object, and an exemplary superimposed image of the object that is used for welding the object within the automated welding system shown in FIG. 1.

FIG. 3 is a schematic view of object data that may be used to identify master model areas and/or at least one area to be welded 126, as described herein. Accordingly, with reference to FIGS. 1-3, and in some embodiments, controller 110 may superimpose a master model image of the object over a corresponding acquired image. For example, and as described above, controller 110 may obtain a master model image 302 of object 112, as well as acquired data, such as an acquired image 304 of object 112. Controller 110 may superimpose master model image 302 over acquired image 304 (or vice versa) to generate superimposed image 306. Controller 110 may identify or determine one or more master model areas 308, such as a plurality of cooling holes in acquired image 304. For example, if master model image 302 includes a plurality of cooling holes, the pixels associated with cooling holes will overlap with the same pixels in acquired image 304. These pixels in acquired image 304 may be identified as master model areas 308 and masked, or identified as one or more masked areas, such as masked areas 312, such that they are excluded from an area to be welded in superimposed image 306 and/or in acquired image 304.

In exemplary process 200, controller 110 also compares acquired image 304 to master model image 302 to identify or determine one or more areas to be welded, such as area to be welded 126 (step 210). Area to be welded 126 may be outside of the master model areas 308 (as described above), so that controller 110 does not erroneously identify master model areas 308 as area to be welded 126 in acquired image 304.

In the exemplary embodiment, area to be welded 126 may be an area in which acquired image 304 differs from master model image 302 in some way. Differences between acquired image 304 and master model image 302 may occur, for example, as a result of wear on object 112 during operation. For example, area to be welded 126 may correspond to a damaged or cracked area of object 112. Where object 112 is an airfoil, area to be welded 126 may also correspond to a blade tip that has been abraded or otherwise worn during service.

In some embodiments, controller 110 provides a control instruction or control signal to structure 102 to raise an internal temperature of structure 102 to a designated or predetermined temperature or a designated or predetermined temperature range. For example, controller 110 may provide a control signal to one or more heating apparatuses 103 that cause heating apparatuses 103 to raise the internal temperature of structure 102 to a temperature at which object 112 becomes ductile, malleable, semi-molten, or otherwise workable. Thus, the predetermined temperature may depend upon the material composition of object 112 and may vary as different objects are provided to automated welding system 100 for inspection and repair.

In exemplary process 200, after controller 110 has identified at least one area to be welded 126 in at least one acquired image 304, and/or in at least one superimposed image 306, controller 110 generates one or more control instructions for controlling welding operations, such as one or more control instructions for controlling one or both of mounting platform 104 and/or welding tool 106 (step 212). The control instructions may be transmitted to mounting platform 104 and/or welding tool 106 for implementation. For example, the control instructions may be provided to one or more actuators 118 and/or joints 120. The control instructions may be any suitable type of control instruction, such as, for example, a computer numerical control (CNC) instruction, and the like. In some embodiments, the control instructions are control signals that are provided to control platform 104 and/or welding tool 106.

The control instructions may specify a welding path, which may be defined with reference to one or more x, y, and/or z coordinates. Mounting platform 104 and/or welding tool 106 may rotate and/or translate, based upon the specified welding path, such that object 112 is positioned relative to welding tool 106 in a manner that facilitates welding by welding tool 106 of area to be welded 126 on object 112. Thus, controller 110 guides mounting platform 104 and/or welding tool 106 along the welding path, such that area to be welded 126 is automatically welded by welding tool 106 along the welding path.

Embodiments of the automated welding system, as described above, facilitate an automated welding process in which an object is inspected to identify areas to be welded, heated to a workable temperature, and repaired by way of an automated welding process. Accordingly, a controller receives acquired data, such as one or more acquired images of an object mounted on a mounting platform within a structure, and compares the acquired data to master model data, such as at least one master model image of the object. The controller identifies one or more areas to be welded based upon the comparison and generates control instructions. One or more master model areas (e.g., cooling holes) are masked by the controller, so that these master model areas are not identified as areas to be welded. Finally, the object is heated within the structure, and the welding tool is operated, by the controller and based upon the control instructions, to repair the object.

Exemplary technical effects of the automated welding system described herein include, for example: (a) inspection of an object at a plurality of inspection positions; (b) identification of master model areas for exclusion from welding operations; (c) identification of areas to be welded (e.g., cracks) for welding; and (d) heating of the object to a temperature or temperature range at which the object is workable.

Exemplary embodiments of an automated welding system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where automated welding is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automated welding system comprising:
   a mounting platform;
   a welding tool;
   an imaging device configured to acquire data associated with an object; and
   a controller configured to:
      receive the acquired data from the imaging device, the acquired data including an acquired image of the object;
      retrieve, from a readable storage medium, stored master model data associated with the object, the stored master model data including a master model image of the object that includes a master model area associated with a feature of the object;
      compare the acquired image to the master model image;
      identify, based on the comparison, pixels associated with the master model area in the acquired image;
      mask the pixels associated with the master model area in the acquired image;
      determine, based on the comparison, an area to be welded in the acquired image, wherein the masked pixels associated with the master model area in the acquired image are excluded from the area to be welded; and
      generate control instructions for controlling at least one of said mounting platform and said welding tool to weld the area to be welded.

2. The automated welding system of claim 1, wherein said controller is further configured to generate control instructions for controlling at least one of a position and an orientation of at least one of said mounting platform and said welding tool.

3. The automated welding system of claim 1, wherein in comparing the acquired image to the master model image, the controller is configured to compare each pixel in the acquired image to a corresponding pixel in the master model image.

4. The automated welding system of claim 1, further comprising a structure configured to receive and secure the object, the structure comprising at least one of a heating apparatus, an insulating material, a shielding medium, a viewing window, a temperature sensor, and a lighting system.

5. The automated welding system of claim 4, wherein said controller is further configured to generate a control instruction for controlling a heating apparatus operable to control an internal temperature of said structure.

6. The automated welding system of claim 5, wherein the control instruction for controlling the internal temperature of said structure comprises an instruction to maintain the internal temperature of said structure at a predetermined temperature range.

7. The automated welding system of claim 1, wherein said mounting platform includes at least one joint that facilitates motion of said mounting platform.

8. The automated welding system of claim 1, wherein the object is an airfoil and the feature is a cooling hole.

9. An article of manufacture including a non-transitory, tangible, computer readable storage medium having instructions stored thereon that, in response to execution by a controller configured for providing control instructions to at least one of a mounting platform and a welding tool, cause said controller to perform operations comprising:
   receiving, by said controller, acquired data of an object from an imaging device, the acquired data including an acquired image of the object;
   retrieving, by said controller, stored master model data associated with the object, the stored master model data including a master model image of the object that includes a master model area associated with a feature of the object;
   comparing, by said controller, the acquired image to the stored master model image;
   identifying, by said controller and based on the comparison, pixels associated with the master model area in the acquired image;
   masking, by said controller, the pixels associated with the master model area in the acquired image;
   determining, by said controller and based on the comparison, an area to be welded in the acquired image, wherein the masked pixels associated with the master model area in the acquired image are excluded from the area to be welded; and
   generating, by said controller, control instructions for controlling at least one of said mounting platform and said welding tool to weld the area to be welded.

10. The article of claim 9, further comprising a structure configured to receive the object and permit welding operations to be conducted on the object at a predetermined temperature range.

11. The article of claim 10, wherein the instructions further cause said controller to perform operations comprising generating, by said controller, a control instruction for controlling a heating apparatus operable to control an internal temperature of said structure.

12. The article of claim 11, wherein the control instruction for controlling the heating apparatus of said structure is an instruction to maintain the internal temperature of said structure within a predetermined temperature range.

13. The article of claim 9, wherein the instructions further cause said controller to perform operations comprising generating control instructions for controlling at least one of a position and an orientation of at least one of said mounting platform and said welding tool.

14. The article of claim 9, further comprising a mounting platform for mounting the object, wherein said mounting platform includes at least one joint that facilitates motion of said mounting platform.

15. The article of claim 9, wherein the object is an airfoil and the feature is a cooling hole.

16. A method for operating a welding system, said method comprising:
   receiving, by a controller configured to control operation of the welding system, acquired data of an object from an imaging device, the acquired data including an acquired image of the object;
   retrieving, by said controller, stored master model data associated with the object, wherein the stored model data is in a readable storage medium, the stored master model data including a master model image of the object that includes a master model area associated with a feature of the object;
   comparing, by said controller, the acquired image to the master model image;
   identifying, by said controller and based on the comparison, pixels associated with the master model area in the acquired image;
   masking, by said controller, the pixels associated with the master model area in the acquired image;
   determining, by said controller and based on the comparison, an area to be welded in the acquired image, wherein the masked pixels associated with the master model area in the acquired image are excluded from the area to be welded; and
   generating, by said controller, control instructions for controlling at least one of said mounting platform and said welding tool to weld the area to be welded.

17. The method of claim 16, further comprising generating, by said controller, control instructions for controlling at least one of a position and an orientation of at least one of said mounting platform and said welding tool.

18. The method of claim 16, further comprising receiving the object within a structure.

19. The method of claim 18, further comprising generating, by the controller, a control instruction for controlling a heating apparatus operable to control an internal temperature of the structure.

20. The method of claim 16, wherein the object is an airfoil and the feature is a cooling hole.

* * * * *